(12) United States Patent
Watkins

(10) Patent No.: US 6,201,568 B1
(45) Date of Patent: *Mar. 13, 2001

(54) HEADREST VIDEO CAMERA

(76) Inventor: D. Scott Watkins, 470 Elgaen Ct., Roswell, GA (US) 30075

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/121,155

(22) Filed: Jul. 22, 1998

(51) Int. Cl.[7] .................. H04N 7/18; H04N 9/47
(52) U.S. Cl. ............ 348/148; 348/61; 348/151; 348/158
(58) Field of Search ............... 348/61, 143, 148, 348/149, 151, 158; 396/419, 427, 429, 661

(56) References Cited

U.S. PATENT DOCUMENTS

| | | | |
|---|---|---|---|
| 277,650 | 5/1883 | Wright | 374/149 |
| 765,980 | 7/1904 | Mercier | 396/419 |
| 2,464,067 | 3/1949 | Barker | 95/11 |
| 2,481,717 | 9/1949 | Blair | 248/183.2 |
| 2,614,471 | 10/1952 | Markowitz | 95/86 |
| 2,794,512 | 6/1957 | Martin | 370/565 |
| 2,794,612 | 6/1957 | Clifton | 396/428 |
| 2,876,688 | 3/1959 | Laue | 95/11 |
| 3,128,982 | 4/1964 | Christopher | 248/183 |
| 3,141,393 | 7/1964 | Platt | 95/1.1 |
| 3,349,679 | 10/1967 | Lohman | 95/11 |
| 3,515,472 | 6/1970 | Schwitzgebel | 352/132 |
| 3,545,710 | 12/1970 | Mooney | 248/183.2 |
| 3,598,355 | 8/1971 | English | 396/428 |
| 3,752,376 | 8/1973 | Shelton et al. | 224/42.45 |
| 3,951,448 | * 4/1976 | Hawie | 297/113 |
| 3,970,274 | * 7/1976 | Resk | 248/185.1 |
| 4,029,246 | 6/1977 | Woodruff | 224/42.45 |
| 4,645,320 | 2/1987 | Muelling | 354/81 |
| 4,974,807 | 12/1990 | Moineau | 224/275 |
| 5,230,490 | 7/1993 | Sloop | 248/187 |
| 5,260,731 | 11/1993 | Baker, Jr. | 354/81 |
| 5,282,182 | 1/1994 | Kreuzer | 369/21 |
| 5,366,194 | 11/1994 | Finney | 248/218.4 |
| 5,664,840 | 9/1997 | Stenzel | 297/391 |
| 5,833,101 | * 11/1998 | Watkins | 224/275 |
| 5,883,739 | * 3/1999 | Ashihara | 359/462 |

FOREIGN PATENT DOCUMENTS

| | | |
|---|---|---|
| 2238993 | 6/1991 | (GB). |
| 59-11939 | 1/1984 | (JP). |
| 10-75389 | * 3/1998 | (JP) ............... H04N/5/225 |

OTHER PUBLICATIONS

Eagleye Dispatch, vol. 2, Summer 1995, Eagleye Technologies, Inc., Rome Georgia.

"The Jo Mount", p. 46, The PI Catalog, Thomas Investigative Publications Austin, TX 78764, Winter 1997–98.

* cited by examiner

*Primary Examiner*—Vu Le
(74) *Attorney, Agent, or Firm*—Baker, Donelson, Bearman & Caldwell

(57) ABSTRACT

A video camera for recording images from a motor vehicle in which the video camera rigidly connects to a support member in a cavity of a headrest for a seat in the motor vehicle. A cover detachably closes an opening in the headrest for insertion and removal of the video camera. An opening in a surface of the headrest allows light to reach lens in the video camera.

23 Claims, 2 Drawing Sheets

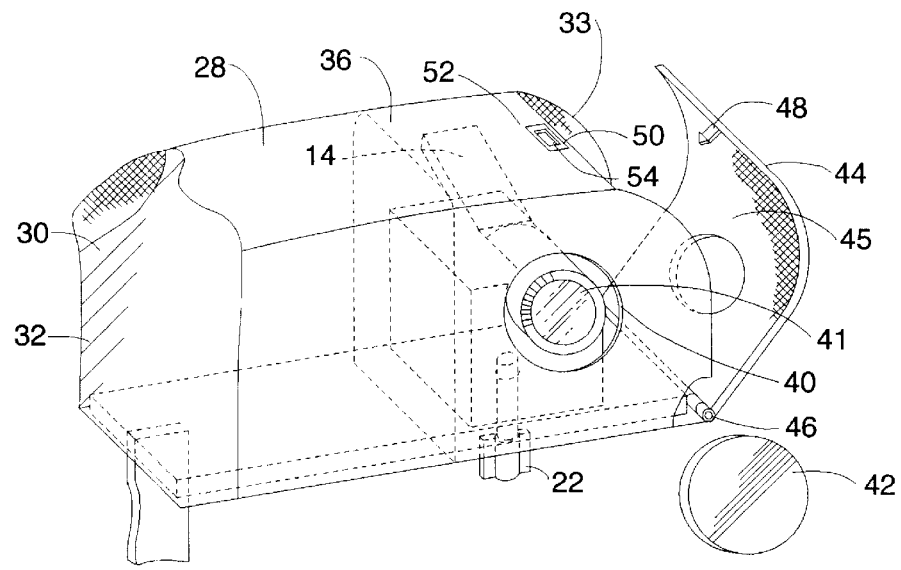
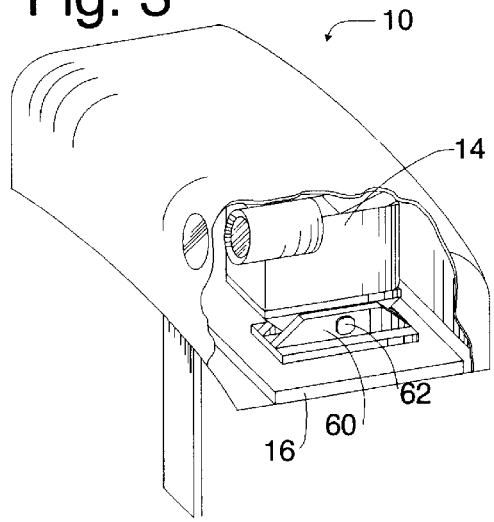
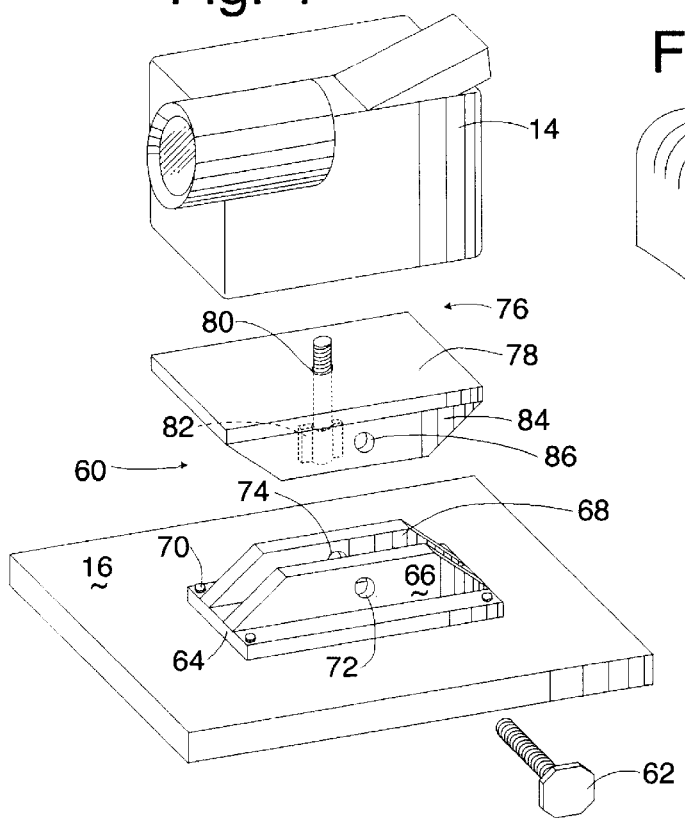

HEADREST VIDEO CAMERA

TECHNICAL FIELD

The present invention relates to apparatus for mounting video cameras in motor vehicles. More particularly, the present invention relates to video camera mounts attached to seats in motor vehicles.

BACKGROUND OF THE INVENTION

In recent years, police and private detectives have added video cameras to their equipment list for patrols and investigations. For police particularly, the video camera provides a visual record of events such as traffic stops, chases, and other incidents of law enforcement. Private detectives also record incidents for evidentiary purposes during investigations.

Various devices have been provided for supporting video cameras in motor vehicles. Stationary investigations allow use of tripods mounted in the motor vehicle to support the video cameras. The tripod readily stands in many vans or other trucks which have room for the legs to spread and thereby provide a stable foundation for using a video camera attached thereto. Tripods however are not readily adaptable for use in passenger vehicles which have limited space in the rear seat portion of the car. Generally, the legs are insufficiently separated for image recording stability.

For police vehicles, video cameras typically mount on U-shaped brackets attached to the forward portion of the roof adjacent the windshield. The bracket receives the video camera for a forward view through the windshield in order to provide a record of traffic stops, automobile chases, and the like. Other camera mounts have been used to secure video or television cameras within automobiles, such as race cars to provide a driver's perspective during an automobile race being broadcasted on television. One known device for mounting a camera in a car maintains the camera level with respect to the roads surface regardless of acceleration or gravitational forces. The camera is supported on a pendulum suspended from is a gimble and constrained with spring and damping elements which match the vehicle suspension system in order to produce equal and opposite rotations of the pendulum in response to the movements of the vehicle.

Other devices are less complicated. One such device mounts a camera in a protective box which attaches to the rear deck of the vehicle near the back window. Telescoping members connect the box to the rear deck. Coil springs absorb shock in order to dampen vibrations communicated to the camera. Another device provides a channel member with a depending plate at one end. The plate is received in a slot of an upper edge of a car seat which normally receives a tongue or support member of a headrest. A distal end of the channel rests on top of the dashboard of the vehicle. A camera mounts with a bolt through an opening in the channel. An elastic hold-down and stabilizing cord is used to secure the distal end of the channel to the dashboard.

My U.S. patent application Ser. No. 08/919,298 discloses a transverse bar which connects at opposing distal ends to the supports for headrests in the seats of motor vehicles. The video camera mounts to a pivotable support attached to the transverse bar, whereby the camera may be oriented at a selected angle for recording.

While these devices have generally functioned to support a camera within a car, there are drawbacks to their use. Mounting the camera on a rear deck of a car does not satisfactorily show dashboard information which is useful and important during automobile races. Also this perspective view differs from that seen by the driver. On the other hand, placing the camera closer to the windshield may have the camera to far forward to show the dashboard of the car which had key gauges, such as the speedometer, displaying information about the car. Brackets which are cantilevered in the car are susceptible to vibration as the distal end is not adequately secured. Further, such brackets that mount to the seat slot for headrest supports occupies one of the headrests and takes the space otherwise occupied by a passenger.

Also, surveillance security and other police activities however need the camera to be less visible from casual observation, which the present devices do not provide.

Accordingly, there is a need in the art for an improved camera mount for motor vehicles. It is to such that the present invention is directed.

BRIEF SUMMARY OF THE INVENTION

The present invention meets the need in the art by providing a video camera mount for motor vehicles, in which the video camera is concealed within a headrest that attaches to the seat of a motor vehicle. More particular, the present invention comprises an elongate member having a distal end portion that defines a bore. A threaded connector extends through the bore. A cushion attaches to the elongate member and defines a cavity at a distal end portion for enclosing a video camera. The threaded connector rigidly engages the video camera to the elongate member. A forward-facing surface of the cushion defines a first hole for being substantially in alignment with a lens of the video camera. The cushion is openable for insertion of the video camera into the cavity for engagement to the elongate member. The elongate member connects by a support to a seat of a motor vehicle.

In another aspect, the present invention provides a headrest integral with a seatback of a seat in a motor vehicle. A frame defines a perimeter shape of a seatback having a headrest in a first portion. A seat cover overlies the frame. The headrest has a main portion that defines a surface on a forward face of the headrest for receiving a head of a person occupying the seat and a second portion lateral of the main portion. The second portion defines a cavity having a support member engaged to a portion of the frame of the seatback. The support member is adapted for rigidly engaging an imaging apparatus. A port in a side wall of the seat provides entrance to the cavity, whereby the imaging apparatus is inserted into the cavity for engagement to the support member. The forward surface of the second portion defining an opening for communicating light to a lens of the imaging apparatus in the cavity.

Objects, advantages and features of the present invention will become apparent from a reading of the following detailed description of the invention and claims in view of the appended drawings.

BRIEF DESCRIPTION OF THE DRAWING

FIG. 2 is a cutaway detailed illustration of the headrest camera mount illustrated in FIG. 1.

FIG. 3 is a side cutaway view of an embodiment of the headrest camera mount including a support or pivotally positioning the camera at a selected angle.

FIG. 4 is a detailed exploded perspective view of the camera mount illustrated in FIG. 3.

DETAILED DESCRIPTION OF THE PREFERRED EMBODIMENTS

Figure 1:
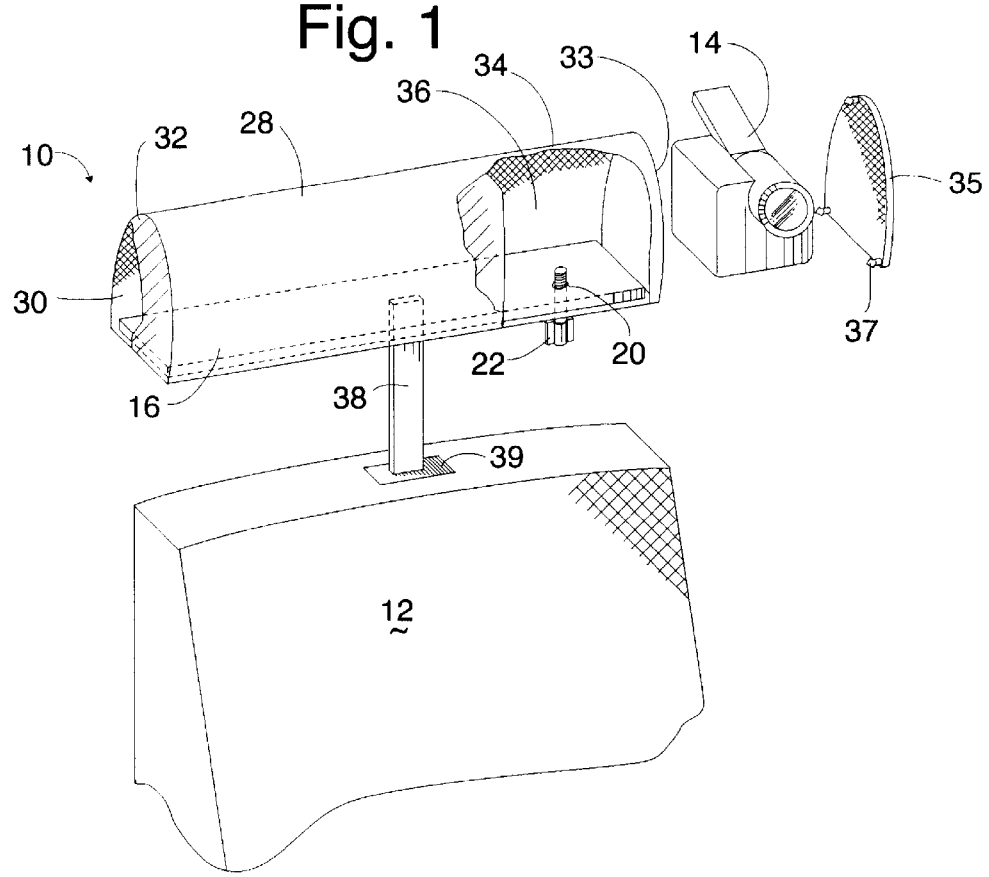
FIG. 1 illustrates in perspective view a headrest camera mount for attaching to the seat of a motor vehicle, according to the present invention.

Referring now in more detail to the drawings in which like parts have like identifiers, FIG. 1 illustrates in perspective view a headrest 10 that attaches to a seat 12 of a motor vehicle while containing a video camera 14 shown exploded away. The headrest 10 has an elongate member 16 in which a distal end 18 defines a bore 20. A threaded connector 22 extends through the bore 20. The connector 22 includes a groove which receives a C-ring. The C-ring conventionally prevents the connector 22 from coming out to the bore 20.

A cushion 28 for the headrest 10 includes a resilient cover 30 that encloses a foam core 32. The cushion 28 attaches conventionally to the elongate member 16. The core 32 does not extend the full length of the elongate member, so that a portion 34 of the cover 30 defines a cavity 36. The cavity 36 receives the video camera 14, which has a threaded bore in a bottom surface for engaging the connector 22. The video camera 14 thereby sits on the elongate member 16 and the connector 22 secures the video camera to the member. The headrest 10 defines an open end 33. The headrest 10 defines an open end 33 which is covered by a removably detachable plate 35. Pins 37 extend laterally from the plate 35 for engaging mating portions of the cover 30, whereby the headrest has a selectively closed distal end. Further, removal of the plate 35 permits access to control buttons on the video camera 14. A support 38 attaches conventionally to the member 16 and depends away from the headrest 10. The support 38 is received within a slot 39 in the seat 12 for connecting the headrest 10 to the seat 12.

As shown in FIG. 2, a front surface of the cover 30 defines an opening 40 through which a lens 41 receives light for communicating an image to the video camera 14. A detachable cap 42 exploded from the headrest 10 covers the opening 40 when the video camera 38 is removed or is not in use. In the embodiment illustrated in FIG. 2, the open end 33 is a closed by a door 44 that defines a side face of the cushion 28. The door 44 attaches along a hinge 46 to a lower portion of the cover 30. In the illustrated embodiment, the door 44 also defines an open port 45, which may be closed by a detachable cover (not illustrated) for a purpose discussed below. Other doors may be gainfully used; for example, a door which slides from a closed position to an open position. A pin 48 projects laterally from a distal portion of the door 44. A plate 50 attaches to an upper portion 52 of the side of the headrest 10. The plate 50 defines an opening 54 for receiving the pin 48 when the door for selectively holding the door closed. As may be appreciated by one of ordinary skill in the art, a back surface of the headrest 10 likewise may include an opening for the lens of video camera to record images from a rearward perspective. In an alternate embodiment, a recorder separate from the camera is mounted in the motor vehicle, for instance in the trunk. A cable (not illustrated) connects between the video camera 14 and the recorder.

FIG. 3 is a side cutaway view of the headrest 10 having a pivot support 6 rigidly connected to the members 16 a bolt 62 locks the pivot support 60 in a selected position whereby the video camera 14 is positioned at a selected angle. FIG. 4 provides a detailed exploded view of the pivot support 60 comprises a base plate 64 having a pair of upwardly extending spaced-apart parallel flanges 66, 68. The base 64 is rigidly connected to the member 16 with a fastener 70 such as bolts, rivets, or the like. The flanges 66, 68 in the illustrated embodiment have a trapezoid shape in end view, with the wider base of the trapezoid integral with the base plate 64. The flange 66 defines a bore 72. The flange 68 defines a threaded bore 74 co-axially aligned with the bore 72.

A pivot plate 76 defines a surface 78 on which the video camera 14 rests. The pivot plate 76 defines a bore 80 which receives a connector 82 for engaging the threaded bore in the video camera 14 whereby the video camera is rigidly connected to the pivot plate 76. A flange 84 depends from the surface 78 at one side. The flange 84 defines a bore 86 which is aligned with the bores 72 and 74 when the flange 84 is positioned between the flanges 66, 68.

Figure 5:
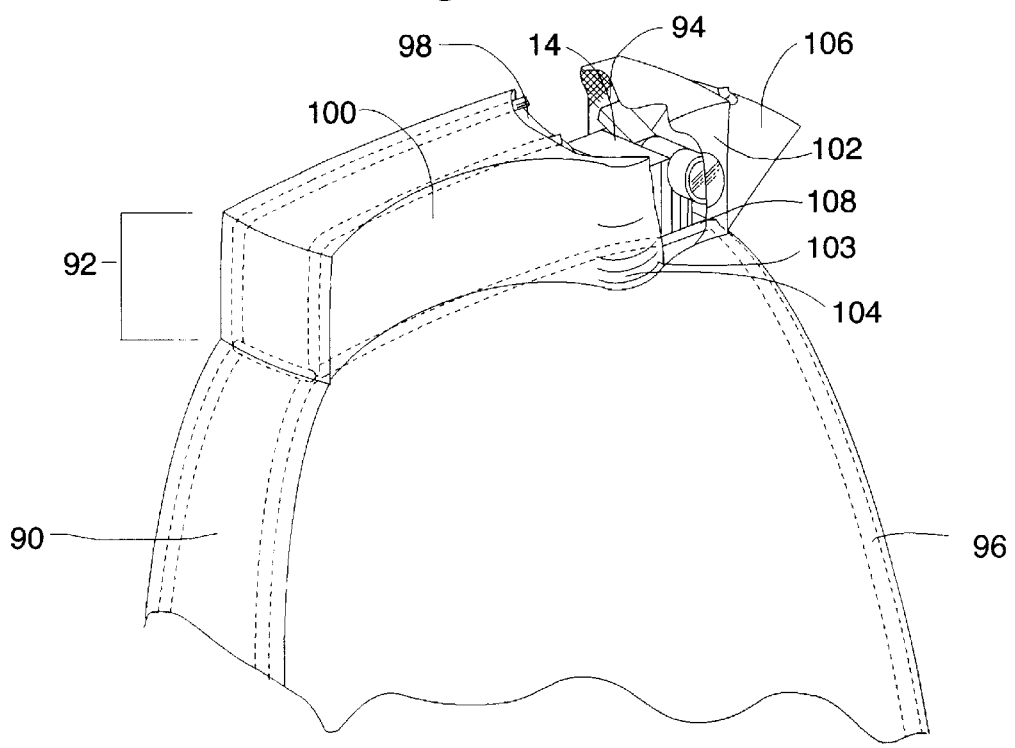
FIG. 5 is a perspective view of a seat back for a motor vehicle having an integral headrest with a camera mount according to the present invention.

FIG. 5 is a perspective view of a portion of a seat back for a seat in a motor vehicle. The seat back 90 includes an integral headrest generally 92 which defines a cavity 94 for receiving the video camera 14. The seat 92 has a frame 96 which defines a perimeter shape of the seat back 90 and the headrest 92. A core member formed of cushioning materials is received by the frame. A seat cover over lies the core member and the frame to define the seat back.

The headrest 92 includes a portion of the core member generally, a core body 98. Typically, the headrest portion of the seat is an extension of the seat back, and may be planer, or arcuate, to conform in style to the seat. In the particular illustrated embodiment, the core body has a main portion that defines a first concave recess 100 on a forward face of the core body. The recess 100 receives a head of a person occupying the seat. A second portion 102 of the core body 98 defines a second concave recess on the forward face of the core body lateral of the main portion 100. The first and second recesses 100 and 102 are separated by a forwardly projecting ridge 104. In an alternate embodiment (not illustrated), the second portion 103 defines a planer forward face. It should be noted that the ridge 104 cooperates with the extending opposite side of the recess 100 to receive the head of a seat occupant, while restricting the head from inadvertently blocking the view of the video camera 14.

The cavity 94 is defined within the second portion of the core body 102. A port in a side wall of the seat 90 is closed by a cover 106. The frame 96 engages a support member which defines a bore for receiving a threaded connector to which the video camera 14 is secured. The forward surface of the headrest 92 defines an opening in the second recess 102 whereby the lens of the video camera receives light for recording images. It is the noted that the support 60 illustrated in FIG. 3 may gainfully be installed in the cavity 94 for selectively positioning the video camera 14 in the integral seat back 90 for recording images.

With reference to FIGS. 1 and 2, the video camera headrest mount of the present invention is installed in motor vehicles for use in recording images from the motor vehicle. The disclosed embodiment shows the camera mount on a right side of the headrest 10 and the seat 90. It should be noted that the camera cavity 36 and 94 may be located on the left side thereof, or the cavity may be formed on both sides of the headrest and seat. The support 38 is slidingly received in the slot 39 in the back of the seat 12. As may be appreciated, some seats in motor vehicles have a pair of spaced-apart slots which each receive a tubular member extending from a conventional headrest, and such supports are likewise included with the scope of the present invention as alternative supports 38. Other headrests include apparatus for pivoting the headrest to accommodate personal preferences in positioning, and the present invention may include such additional features.

The door 44 is pivoted open by detaching the pin 48 from the opening 54 and pulling the door at its distal end 52 downwardly towards the seat 12. The video camera 14 is inserted through the opening in the side of the headrest 10 into the cavity 36. The connector 22 is threadably engaged to the video camera 14 to secure the video camera 14 with the lens aligned with the opening 40. The cap 42 is detached during operation of the video camera. The door 44 is pivoted closed with the pin 48 engaging the opening 54. Also, the video camera may be oriented so that the lens is pointed towards the port 45, for recording images to the side of the motored vehicle.

With reference to FIGS. 3 and 4, the cavity 36 may include the pivot plate 60. The connector 82 extending through the pivot plate 76 engages the video camera 14. The bolt 62 is loosened and the pivot plate 76 tilted about the bolt with the flange 94 disposed between the flanges 66, 68. The bolt 62 is tightened when the pivot plate 76 is at the selected angle. The lens of the video camera aligns with the opening in the headrest for recording images.

With reference to FIG. 5, the seat back 90 is preferably installed as original equipment by the manufacturer of the motor vehicle, although a secondary market is not excluded. The cover 106 is detached from the side of the seat back 90. The video camera 14 is inserted into the cavity 94 and attached to the support by the threaded connector. The cover 106 is reinstalled, after the video camera 14 is started. In an alternate embodiment, remote control devices are used to control the operation of the camera.

For police operations, the video camera 14 is connected by a cable to a controller for activation of the recording. The video camera 14 records automatically when the siren or lights are activated, and such control device is conventional. The headrest according to the present invention provides a conventional appearing headrest independently insertable into the backs of seats in motor vehicles or integrally included in seatbacks, with the cavity for holding a video camera for recording. It is preferred that the video camera 14 be digital, for a smaller size to fit the conventional size headrest 10. In an alternate embodiment, the headrest 10 and seat 90 receive a lens device which communicates by a cable to a separate recorder mounted elsewhere in the motor vehicle.

It is thus seen that an improved headrest is provided for mounting a video camera in a motor vehicle as an integrated system. While this invention has been described in detail with particular reference to the preferred embodiments thereof, the principles and modes of operation of the present invention have been described in the foregoing specification. The invention is not to be construed as limited to the particular forms disclosed because these are regarded as illustrative rather than restrictive. Moreover, modifications, variations and changes may be made by those skilled in the art without departure from the spirit and scope of the invention as described by the following claims.

What is claimed is:

1. A headrest mount for attaching a video imaging apparatus to a seat of a motor vehicle, comprising:
   an elongate member for supporting a video imaging apparatus thereon for imaging forwardly thereof;
   a fastener for securing the video imaging apparatus to the elongate member;
   a cushion for attachment to a seat of a motor vehicle attached to the elongate member and defining a cavity at a distal end portion for enclosing the video imaging apparatus therein laterally of a portion of the cushion used for headrest purposes and said video imaging apparatus centrally disposed relative to a central axis of the motor vehicle, and a surface of the cushion defining a first hole for being substantially in alignment with a lens of the video imaging apparatus, whereby the video imaging apparatus is unobstructed for use by a passenger whose head is immediately in front of the portion of the cushion used for headrest purposes when the seat being used as a seat; and
   a connector for connecting the cushion to a seat of a motor vehicle.

2. The headrest mount as recited in claim 1, further comprising a first door pivotally connected to the elongate member for opening the cushion for insertion of the video imaging apparatus therein.

3. The headrest mount as recited in claim 2, wherein the first door defines a portion of a surface of the cushion.

4. The headrest mount as recited in claim 1, further comprising a plate detachably engaged to a portion of the cushion, whereby the cavity is accessible for insertion of the video imaging apparatus into the cavity.

5. The headrest mount as recited in claim 4, wherein the plate defines at least a portion of a side surface of the cushion.

6. The mount as recited in claim 1, further comprising an access opening in an end surface of the cushion, whereby control buttons on the video imaging apparatus are accessible for operation thereof.

7. The headrest mount as recited in claim 6, wherein the access opening is defined by a selectively openable second door.

8. The mount as recited in claim 7, wherein the second door pivotally connects to the cushion.

9. The mount as recited in claim 1, further comprising a pivot member attached to the elongate member, which pivot member detachably engages the video imaging apparatus for being positionable at a selected angle.

10. The headrest mount as recited in claim 1,
    wherein the elongate member has a distal end portion that define a bore; and
    the fastener comprises a threaded connector extending through the bore for engaging a threaded connector on the video imaging apparatus.

11. The headrest mount as recited in claim 1, further comprising an opening in the cushion whereby the video imaging apparatus is insertable in the opening for engagement to the elongate member.

12. A headrest integral with a seatback of a seat in a motor vehicle for attaching a video imaging apparatus therein, comprising:
    a frame for a seat having cushioning pads therein and defining a perimeter shape of a seatback of a seat for installing in a motor vehicle and having a cushioned headrest in a first portion thereof;
    a seat cover overlying the frame; and
    the headrest having a main portion that defines a surface thereon for receiving a head of a person occupying the seat and a second portion of the headrest laterally offset from a central axis of the main portion of the headrest and defining a cavity therein with an opening for being in alignment with a video imaging apparatus disposed in the cavity for imaging forwardly thereof while unobstructed by use of the seat by the person when the person's head is immediately in front of the main portion of the headrest.

13. The headrest as recited in claim 12, further comprising a support member for the video imaging apparatus, whereby said video imaging apparatus is positionable at a selected angle.

14. The headrest as recited in claim 12, wherein the main portion and the second portion each define respective concave recesses on a forward face of the covered frame, which recesses are separated by a forwardly projecting ridge therebetween.

15. The headrest as recited in claim 12, wherein the surface of the main portion defines a concave recess.

16. The headrest as recited in claim 12, wherein a side wall of the headrest defines a port for insertion of the video imaging apparatus into the cavity; and further comprising a selectively openable cover for closing the port.

17. A seat including a camera imaging apparatus, comprising:
- a camera imaging apparatus fixedly attached to said seat laterally offset from a central axis thereof and centrally disposed relative to a central axis of a vehicle for receiving said seat for imaging forwardly from said seat such that said camera imaging apparatus is unobstructed by use of said seat by a passenger when the passenger's head is immediately central to the central axis of the seat during use of the seat as a seat;
- said camera imaging apparatus including one or more lens and adapted to create one or more electrical signal representative of the images received by said one or more lens;
- signal transmitting pathway transmitting said one or more electrical signal to a signal receiver for processing the signal,
- whereby the signal receiver processes said one or more electrical signal for visual display, recording, or communication thereof to a remote receiver.

18. The seat as recited in claim 17, wherein the signal receiver comprises an image display for displaying an image representative of the electrical signal recorded by the signal recorder.

19. The seat as recited in claim 17, wherein the signal receiver comprises an image display for displaying an image representative of the electrical signal received by the lens.

20. The seat as recited in claim 17, wherein said signal transmitting pathway comprises a cable signal path extending through the seat.

21. The seat as recited in claim 17, wherein said fixedly attached camera imaging apparatus is attached by a fungible member such that said member will break under crash force.

22. The seat as recited in claim 17, wherein said one or more lens has at least one lens directed forwardly and at least one lens directed rearwardly.

23. The seat as recited in claim 22, wherein one or more said forwardly directed and rearwardly directed lenses are selectable for communicating said electrical signal to the signal recorder.

\* \* \* \* \*